March 26, 1940. D. A. WALLACE 2,195,065
FINISHING APPARATUS AND METHOD
Filed Nov. 5, 1938
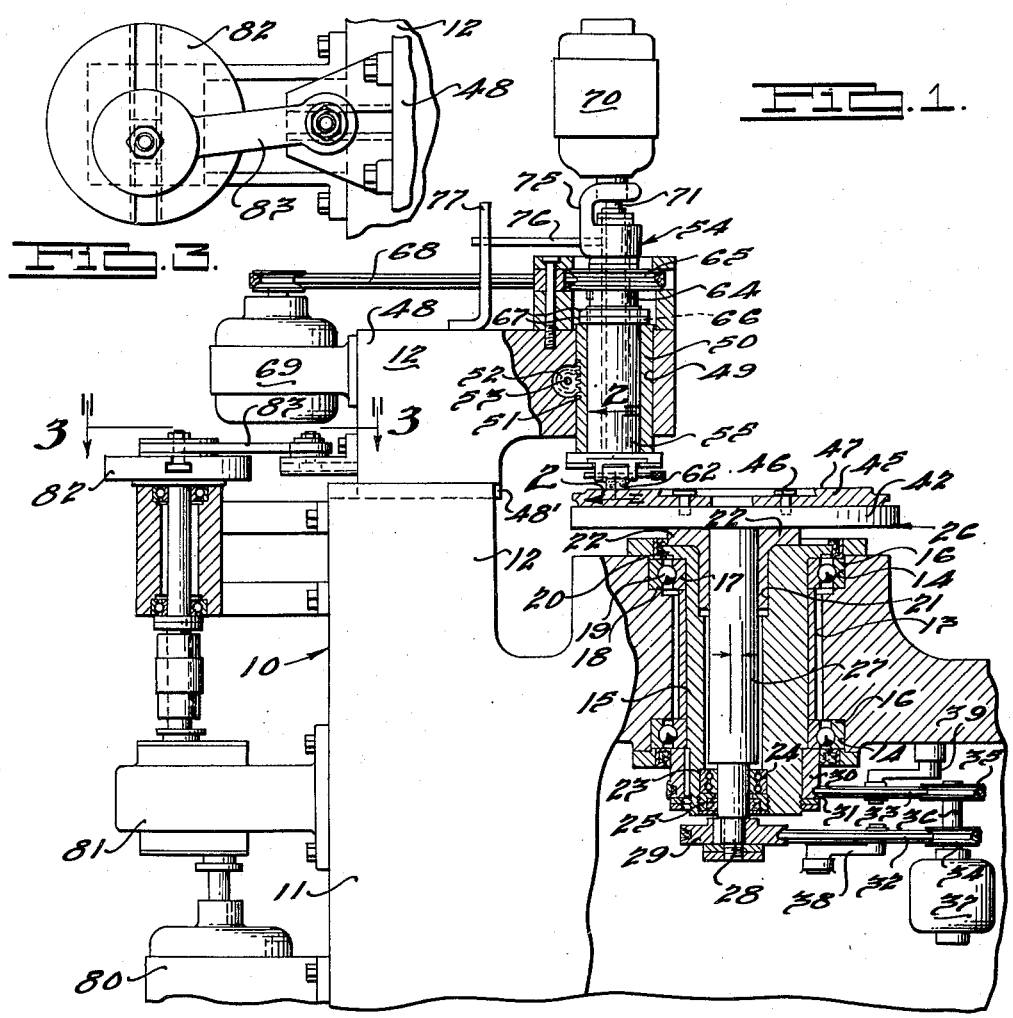
INVENTOR
DAVID A. WALLACE.
BY Harness, Lind, Paley & Harris
ATTORNEYS.

Patented Mar. 26, 1940

2,195,065

UNITED STATES PATENT OFFICE 2,195,065

FINISHING APPARATUS AND METHOD

David A. Wallace, Detroit, Mich., assignor to Chrysler Corporation, Highland Park, Mich., a corporation of Delaware Application November 5, 1938, Serial No. 238,947

7 Claims. (Cl. 51—60)

This invention relates to an improved lapping apparatus and method.

More particularly, the invention has reference to an improved lapping apparatus of the type described and claimed in my co-pending application, Serial No. 132,688, filed March 24, 1937.

The main object of the invention is to provide between an article being lapped and the lapping element, a relative movement which is the resultant of a plurality of different simultaneously component movements of the lapping element and the work. This is accomplished by rotating and rapidly reciprocating the lapping element and revolving and rotating the work while slowly reciprocating the lapping element across the face of the work.

Another object of the invention resides in the provision of relative movement between a lapping element and a piece of work which is the resultant of simultaneous relative rotating and revolving actions between the latter and the former, and also bodily shifting of the lapping element across the face of the work while the lapping element reciprocates independently of the aforesaid bodily movement, and selected combinations thereof.

A further object of the invention is to provide an improved method for lapping a piece of work which comprises simultaneously rotating the work about one axis and revolving the same about another axis while rotating and reciprocating the lapping element and shifting the entire lapping tool bodily across the face of the work, or selected combinations of these movements.

Other objects and advantages of the invention will be more apparent from the following description taken in connection with the accompanying drawing, in which:

Fig. 1 is a side elevational view, partly in section, of a lapping machine embodying the invention.

Fig. 2 is a fragmentary vertical sectional view taken on the line 2—2 of Fig. 1.

Fig. 3 is an enlarged plan view taken as indicated by the line 3—3 of Fig. 1.

In the form of the invention illustrated in the drawing, the improved lapping machine comprises a base structure, generally designated by the numeral 10, having a lower horizontal bed portion 11 and an upstanding vertical portion 12. Formed in the bed portion 11 is a cylindrical bore 13 having counterbore recesses 14 at its opposite extremity. A tubular journal member 15 is rotatably supported in the cylindrical bore 13 by bearings 16 disposed in the recesses 14. Each bearing 16 comprises inner and outer bearing races 17 and 18, respectively, between which is disposed a series of ball bearings 19. The tubular journal member 15 is provided at its upper end with a radial flange 20 which is seated upon the upper edge portion of the inner bearing race 17, as illustrated in Fig. 1. Formed in the upper end portion of the journal member 15 is a counterbore 21 in which a bushing 22 is disposed. The lower end portion of the journal 15 has a counterbore, as illustrated at 23, for the reception of a roller bearing unit 24 which is removably held in the lower end portion of the journal member 15 by a threaded plug 25.

A work supporting table 26 having a spindle portion 27 journalled in the bushing 22 and bearing unit 24 is rotatably mounted in the journal member 15, the bushing 22 and bearing unit 24 being so constructed and arranged as to bring the rotative axis of the spindle 27 into eccentric relationship with respect to the rotative axis of the journal member 15. This may be accomplished by suitable bushing and bearing construction or by forming the counterbores 21 and 23 of the journal member 15 eccentric with respect to the axis of rotation of the latter. The lower end portion of the spindle 27 is provided with a reduced end portion 28 on which a pulley 29 is non-rotatably fixed. A collar 30 having a belt groove 31 therein is non-rotatably fixed on the lower end portion of the journal member 15 which extends below the lower extremity of the bed portion 11 of the base structure. The pulley 29 and collar 30 are drivingly connected by belts 32 and 33 to driving pulleys 34 and 35 mounted on the shaft 36 of an electric motor 37, or other suitable driving means carried by the base structure. Belt tensioning members 38 and 39 having wheels on their free end portions are provided for taking up the slack in the belts 32 and 33. The work table comprises a disc 42 mounted on the upper end of the spindle 27.

A piece of work 45 is shown detachably secured to the upper side of the disc 42 by bolts 46, or other suitable means. The work 45 may comprise any part which has a substantially plane surface 47 to be lapped.

The upstanding portion 12 of the base structure 11 is provided with a head member 48 which is slidably mounted at 48' for movement in a plane normal to the axis of the work table 26 and which has formed therein a cylindrical bore 49. The head 48 extends over the work table 26 and the bore registers vertically with the surface portions of the work 45 to be lapped. Vertically reciprocably mounted in the bore 49 is a sleeve 50 having rack teeth 51 formed on its outer periphery and meshed with the teeth of a rack gear 52 mounted on a shaft 53 which is journalled in the head structure 48 and provided with an operating handle (not shown) by which the sleeve 50 may be raised and lowered, as desired.

The sleeve 50 serves as a support for the lapping or abrading tool, generally designated by the numeral 54, which includes a tubular base portion 55 rotatably mounted in the sleeve 50. The tubular base portion 55 has a head part 56 on its lower extremity in which a channel 57 is provided. The channel 57 is disposed in a plane substantially normal to the axis of rotation of the base portion 55 of the tool and has a lower open side restricted by cleats 58. Slidably mounted in the channel 57 is a block 59 having spaced downwardly extending flanges 60 on its lower extremity between which is disposed a lapping element carrier 61 having a lapping or abrading element 62 comprising natural stone, bonded synthetic abrading material, or other suitable abrading composition. The abrading element carrier 61 is pivotally attached to the spaced flanges 60 of the head 56 by a removable pin 63.

The tubular body portion 55 of the tool 54 has an upper external end portion 64 which extends upwardly of the head 48 and on which is non-rotatably mounted a pulley wheel 65. A section of the tubular base portion 55 between the pulley wheel 65 and the flange 48 is threaded as illustrated at 66 for accommodating the attachment thereto of locking nuts 67 which are adapted to have thrust bearing engagement with the upper extremity of the sleeve 50 as illustrated in Fig. 1. The pulley wheel 65 is drivingly connected by a belt 68 with a motor 69 mounted on the head member 48.

Operation of the motor 69 rotates the tubular body portion 55 of the abrading tool 54 about its vertical axis, thereby similarly rotating the abrading element 62 bodily with respect to the work 45. During rotating of the abrading element 62 in the foregoing manner, the abrading element is also reciprocated relative to the tubular base portion of the tool by a motor 70 having a shaft 71 on the lower extremity on which is provided an eccentrically located driving pin 72. The driving pin 72 has a bushing 73 thereon which is slidably mounted in an elongated slot 74 formed in the slide block 59. During rotation of the shaft 71 the block 59 is reciprocated in the channel 57 in a direction substantially normal to the axis of the tool. The motor 70 is preferably operated at a relatively high speed in order to subject the block 59 and the abrading element 62 carried thereby to reciprocatory movement approaching a vibratory order. This reciprocation of the abrading element 62 occurs simultaneously with the bodily rotation thereof by the motor 69, which rotation preferably occurs at a comparatively slow speed.

In the tool shown in Figs. 1 and 2, the motor shaft 71 is preferably so constructed with respect to the outside axes of the tubular base portion 55 as to maintain an eccentric relationship between these two rotative axes. If desired, however, the axes of rotation of the shaft 71 and tubular body portion 55 of the tool 54 may be concentric. The motor 70 is preferably supported by a fixture 75 which merely rests upon the upper extremity of the tubular body portion 55 and which is provided with a torque arm 76 which engages a stop 77 mounted on the upper extremity of the head member 47 in order to prevent turning of the motor 70 in unison with, or by the tubular base portion 55.

Suitable means, such as a motor 80, are employed to shift bodily the entire lapping tool 54 across the face of the work. The motor 80 is mounted on the bed portion 11 and preferably acts through a speed reducing gear mechanism 81 to revolve the eccentric member 82 which is operatively connected with the head member 48 by a link 83.

Referring to the operation of the illustrated lapping apparatus, the lapping element 62 is placed in engagement with the surface 47 of a piece of work 45 by allowing the tool to move downwardly until the lower surface of the lapping element engages the surface 47 of the work. The tool 54 may be lifted to accommodate removal of the work 45 by rotating the rack gear 52 by manipulation of a handle (not shown) on the shaft 53 by which the gear 52 is carried. While the lapping element 62 is in engagement with the surface 47 of the work, the latter may be rotated about the axis of the spindle 27 and revolved about the eccentric axis of the journal member 15. During this movement of the work, the lapping element 62 is reciprocated by the motor 70 and rotated by the motor 69 and associated driving structures. The head member 48 is preferably reciprocated by the motor 80 at a relatively low rate to bodily shift the entire lapping tool 54 across the face of the work 45 while the lapping element is reciprocated and rotated by motors 70 and 69 respectively.

During the operation of the lapping apparatus there is a relative movement between the work and the lapping element which is the resultant of a plurality of different simultaneous component movements of the lapping element and the work by rotating and rapidly reciprocating the former, and by revolving and rotating the latter while reciprocating the lapping tool bodily across the face of the work at a relatively slow speed. If desired, the work may be rotated about the axis of the spindle 27 only while the journal member 15 is held at rest during combined rotating and reciprocating actions of the lapping element and bodily reciprocation of the head member 48; or, the work may be revolved by rotating the journal member 15 without drivingly rotating the work about the axis of the spindle during the lapping operation. Either the rapid reciprocating or the rotating movement of the lapping element 62 may be discontinued during either of the foregoing modes of movement of the work, if desired. It is preferable, however, to rotate and rapidly reciprocate the abrading element 62 and revolve and rotate the work 45, and reciprocate the abrading tool 54 bodily during the abrading operation in order to provide relative movements between the abrading element and the surface of the work operated upon which is a resultant of a greater number of component movements so as to guard against repeated applications of localized hard or sharp particles of abrading material to the same increment of area of the surface operated upon. In this manner, the formation of scratches on the surface being abraded is avoided and complete removal of all the machine-formed grooves and other irregularities of the surface 47 is rapidly accomplished.

Although but one specific embodiment of the invention is herein shown and described, it will be understood that various changes in the size, shape and arrangement of parts may be made without departing from the spirit of the invention.

What I claim is:

1. Finishing apparatus comprising a base structure, a carriage rotatably mounted on said base structure, means for supporting work including a work table rotatably mounted on said carriage in eccentric relationship with respect to the axis thereof, means for simultaneously rotating said carriage and said work table about their respective axes, an abrading tool having an abrading element reciprocably mounted therein and disposed in opposing relationship with respect to said work table and including means for reciprocating said abrading element at a rate approaching vibratory order relative to said work table and relative to work supported thereby during simultaneous rotating and revolving movement of the latter about the axis of said work table and about the axis of said carriage respectively, and means for riciprocating said abrading element, while vibrating, across the face of said work at a relatively low rate and while said work revolves and rotates.

2. Finishing apparatus comprising a base structure, a carriage rotatably mounted on said base structure, means for supporting work including a work table rotatably mounted on said carriage in eccentric relationship with respect to the axis thereof, means for simultaneously rotating said carriage and said work table about their respective axes, an abrading tool having an abrading element rotatably and reciprocably mounted thereon and disposed in opposing relationship with respect to said work table and including means for reciprocating said abrading element at a rate approaching vibratory order and for rotating said abrading element during application thereof to work supported on said work table, and means for reciprocating said abrading element across the face of said work at a relatively low rate while vibrating and rotating and while said work revolves and rotates.

3. Lapping apparatus comprising a base structure, a carriage rotatably mounted on said base structure, means for supporting work including a work table rotatably mounted on said carriage in eccentric relationship with respect to the axis thereof, means for simultaneously rotating said carriage and said work table about their respective axes, a shiftable head member supported by said base structure and adapted to move in a plane substantially normal to the axis of said carriage, a lapping tool carried by said head member and having a lapping element rotatably and reciprocably mounted thereon and disposed in opposing relationship with respect to said work table and including means for simultaneously reciprocating said lapping element at a rate approaching vibratory order and rotating said lapping element, and means for reciprocating said head member at a relatively slow rate while said element vibrates and rotates and while said work revolves and rotates.

4. Lapping apparatus comprising a base structure, a carriage rotatably mounted on said base structure, means for supporting work including a work table eccentrically mounted on said carriage, apparatus for rotating said carriage and said work table about their respective axes, a shiftable head member supported by said structure and adapted to move in a plane substantially normal to the axis of said carriage, a lapping tool carrier rotatably mounted on said head member, a lapping tool mounted on said tool carrier in eccentric relationship with respect to the axis of the latter and having a reciprocably mounted lapping element thereon disposed in opposing relationship with respect to said work table, said tool including means for simultaneously rotating said tool about its rotative axis and reciprocating said lapping element at a relatively rapid rate, and means for reciprocating said head member at a relatively low rate while rapidly reciprocating and rotating said lapping element and while said work revolves and rotates.

5. Lapping apparatus comprising a support, a carriage rotatably mounted on said support, means for supporting work including a work table eccentrically mounted on said carriage, apparatus for rotating said carriage and said work table about their respective axes, a shiftable head member supported by said structure and adapted to move in a plane substantially normal to the axis of said carriage, a lapping tool carriage rotatably mounted on said head member, a lapping tool mounted on said tool carriage in eccentric relationship with respect to the axis of the latter and having a reciprocably mounted lapping element thereon disposed in opposing relationship with respect to said work table, said tool including means for simultaneously revolving said tool about the axis of said tool carriage and reciprocating said element at a relatively rapid rate, and means for reciprocating said head member at a relatively low rate while revolving said tool and rapidly reciprocating said element and while said work revolves and rotates.

6. The method of lapping a surface of a workpiece which comprises applying a lapping element to said surface and rotating the workpiece about one axis while revolving the same about another axis, and reciprocating said lapping element while rotating it and traversing it bodily across said surface.

7. The method of abrading a surface of a workpiece which comprises applying an abrading element to said surface and rotating the workpiece about one axis while revolving the same about another axis, and reciprocating said abrading element and revolving it while at the same time bodily traversing it across said surface.

DAVID A. WALLACE.

CERTIFICATE OF CORRECTION.

Patent No. 2,195,065. March 26, 1940.

DAVID A. WALLACE.

It is hereby certified that error appears in the printed specification of the above numbered patent requiring correction as follows: Page 2, first column, line 66, for the word "outside" read --rotative--; and that the said Letters Patent should be read with this correction therein that the same may conform to the record of the case in the Patent Office.

Signed and sealed this 23rd day of July, A. D. 1940.

(Seal)

Henry Van Arsdale,
Acting Commissioner of Patents.